US008715064B2

(12) United States Patent
Luciano, Jr. et al.

(10) Patent No.: US 8,715,064 B2
(45) Date of Patent: May 6, 2014

(54) DYNAMIC PAYTABLE FOR INTERACTIVE GAMES

(75) Inventors: Robert A. Luciano, Jr., Reno, NV (US); William K. Bertram, Reno, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 64 days.

(21) Appl. No.: 12/605,090

(22) Filed: Oct. 23, 2009

(65) Prior Publication Data

US 2010/0167813 A1 Jul. 1, 2010

Related U.S. Application Data

(63) Continuation of application No. 10/273,440, filed on Oct. 16, 2002, now Pat. No. 7,628,691.

(60) Provisional application No. 60/348,114, filed on Oct. 17, 2001.

(51) Int. Cl.
*G07F 17/32* (2006.01)
*A63F 13/10* (2006.01)

(52) U.S. Cl.
CPC .................................. *G07F 17/3244* (2013.01)
USPC ........................................................... 463/25

(58) Field of Classification Search
CPC ... A63F 1/18; A63F 11/0051; A63F 11/0074; A63F 2011/0065; A63F 2011/0072; A63F 2011/0076; A63F 2011/0083; A63F 2011/0086; A63F 2011/009; A63F 2300/61; G07F 17/3258; G07F 17/3267; G07F 17/3262; G07F 17/3265; G07F 17/326; G07F 17/3244
USPC .................................... 463/16, 20, 25, 17–19
See application file for complete search history.

(56) References Cited

U.S. PATENT DOCUMENTS

| | | | | |
|---|---|---|---|---|
| 5,033,744 | A * | 7/1991 | Bridgeman et al. | 463/13 |
| 5,123,649 | A | 6/1992 | Tiberio | |
| 5,326,104 | A | 7/1994 | Pease et al. | |
| 5,494,287 | A | 2/1996 | Manz | |
| 5,542,669 | A * | 8/1996 | Charron et al. | 463/13 |
| 5,651,735 | A | 7/1997 | Baba | |
| 5,758,875 | A | 6/1998 | Giacalone, Jr. | |

(Continued)

OTHER PUBLICATIONS

"Scarne's Encyclopedia of Card Games," by John Scarne, (c) 1973, HarperCollins, pp. 1-55.

(Continued)

*Primary Examiner* — David L Lewis
*Assistant Examiner* — Matthew D Hoel
(74) *Attorney, Agent, or Firm* — Mick Kerr; Marvin Hein

(57) ABSTRACT

A gaming system and method that includes a dynamic paytable is described. The method operates by enabling a game session that includes a plurality of game events. After each game event, the player is given an opportunity to terminate or continue the game session. The player can use skill to determine whether to terminate or continue the game session. A paytable determines whether a prize is awarded to said player after each game event. In one embodiment, the dynamic paytable is displayed on a player interface. During the game session, the player may terminate the game session before the remaining game events are completed. The player is provided with an opportunity to view the paytable and can generate a strategy to maximize the prize awarded or minimize losses generated during the game session.

21 Claims, 11 Drawing Sheets

(56) References Cited

U.S. PATENT DOCUMENTS

| | | | | | |
|---|---|---|---|---|---|
| 5,779,547 | A | * | 7/1998 | SoRelle et al. | 463/28 |
| 5,851,147 | A | | 12/1998 | Stupak et al. | |
| 5,902,184 | A | | 5/1999 | Bennett | |
| 5,984,779 | A | | 11/1999 | Bridgeman et al. | |
| 6,004,207 | A | | 12/1999 | Wilson et al. | |
| 6,039,648 | A | | 3/2000 | Guinn et al. | |
| 6,155,925 | A | | 12/2000 | Giobbi et al. | |
| 6,173,955 | B1 | * | 1/2001 | Perrie et al. | 273/146 |
| 6,217,024 | B1 | * | 4/2001 | Lofink et al. | 273/292 |
| 6,224,482 | B1 | | 5/2001 | Bennett | |
| 6,261,178 | B1 | | 7/2001 | Bennett | |
| 6,267,669 | B1 | | 7/2001 | Luciano, Jr. et al. | |
| 6,305,686 | B1 | * | 10/2001 | Perrie et al. | 273/146 |
| 6,309,300 | B1 | | 10/2001 | Glavich | |
| 6,315,662 | B1 | | 11/2001 | Jorasch et al. | |
| 6,368,214 | B1 | * | 4/2002 | Luciano | 463/18 |
| 6,481,713 | B2 | * | 11/2002 | Perrie et al. | 273/146 |
| 6,520,856 | B1 | | 2/2003 | Walker et al. | |
| 6,537,151 | B1 | | 3/2003 | Walker et al. | |
| 6,634,946 | B1 | * | 10/2003 | Bridgeman et al. | 463/28 |
| 6,663,487 | B1 | | 12/2003 | Ladner | |
| 6,695,696 | B1 | * | 2/2004 | Kaminkow | 463/16 |
| 6,695,700 | B2 | | 2/2004 | Walker et al. | |
| 6,712,693 | B1 | | 3/2004 | Hettinger | |
| 6,712,695 | B2 | | 3/2004 | Mothwurf et al. | |
| 6,739,970 | B2 | * | 5/2004 | Luciano | 463/18 |
| 6,802,778 | B1 | | 10/2004 | Lemay et al. | |
| 6,824,465 | B2 | * | 11/2004 | Luciano, Jr. | 463/18 |
| 6,890,254 | B2 | * | 5/2005 | Kaminkow | 463/16 |
| 6,942,566 | B2 | | 9/2005 | Baelocher et al. | |
| 7,029,395 | B1 | * | 4/2006 | Baerlocher | 463/20 |
| 7,281,979 | B2 | * | 10/2007 | Luciano, Jr. | 463/18 |
| 7,338,361 | B1 | * | 3/2008 | Luciano, Jr. | 463/12 |
| 7,481,710 | B2 | * | 1/2009 | Kaminkow | 463/31 |
| 7,520,807 | B2 | * | 4/2009 | Muskin | 463/13 |
| 7,628,691 | B2 | * | 12/2009 | Luciano, Jr. | 463/18 |
| 7,727,061 | B2 | * | 6/2010 | Taylor | 463/16 |
| 7,727,064 | B1 | * | 6/2010 | Luciano, Jr. | 463/19 |
| 7,727,068 | B2 | * | 6/2010 | Peterson | 463/25 |
| 2002/0036380 | A1 | * | 3/2002 | Perrie et al. | 273/146 |
| 2002/0058545 | A1 | * | 5/2002 | Luciano | 463/18 |
| 2002/0160827 | A1 | * | 10/2002 | Slomiany et al. | 463/16 |
| 2002/0163127 | A1 | * | 11/2002 | Perrie et al. | 273/274 |
| 2003/0232638 | A1 | * | 12/2003 | Luciano, Jr. | 463/12 |
| 2004/0023715 | A1 | | 2/2004 | Luciano, Jr. et al. | |
| 2004/0061288 | A1 | * | 4/2004 | Snow | 273/274 |
| 2004/0090005 | A1 | * | 5/2004 | Snow | 273/292 |

OTHER PUBLICATIONS

"The Everything Casino Gambling Book," Schneider, 2004, Adams Media, Avon, Mass., pp. 13-26.

* cited by examiner

240

Set Graduated Weighted Function

☑ Percentage Effect On

| Number of Spots: | Start Percentage: | Stop Percentage: |
|---|---|---|
| 4 | 85 | 115 |
| 5 | 83 | 106 |
| 6 | 82 | 104 |
| 7 | 80 | 102 |
| 8 | 75 | 100 |

FIG. 5

242

Set Pay Allocations

243

Hits

244

Spots Marked

| | 1 | 2 | 3 | 4 | 5 | 6 | 7 | 8 | Total |
|---|---|---|---|---|---|---|---|---|---|
| 1 | 0.99 | | | | | | | | 0.99 |
| 2 | 0 | 0.99 | | | | | | | 0.99 |
| 3 | 0 | 0 | 1 | | | | | | 1 |
| 4 | 0 | 0.19 | 0.2 | 0.6 | | | | | 0.99 |
| 5 | 0 | 0 | 0.19 | 0.2 | 0.6 | | | | 0.99 |
| 6 | 0 | 0 | 0.14 | 0.15 | 0.2 | 0.5 | | | 0.99 |
| 7 | 0 | 0 | 0.09 | 0.1 | 0.1 | 0.2 | 0.5 | | 0.99 |
| 8 | 0 | 0 | 0 | 0 | 0 | 0 | 0 | 1 | 0.99 |

FIG. 6

Illustrative Look-up Table for First Drawn Ball

248

| | | | | | | | | | |
|---|---|---|---|---|---|---|---|---|---|
| 0 | 20 | | | | | | | | 1-Spot |
| 0 | 0 | 0 | | | | | | | 2-Spot |
| 0 | 0 | 0 | 0 | | | | | | 3-Spot |
| 0 | 0 | 0 | 0 | 0 | | | | | 4-Spot |
| 0 | 0 | 0 | 0 | 0 | 0 | | | | 5-Spot |
| 0 | 0 | 0 | 0 | 0 | 0 | 0 | | | 6-Spot |
| 0 | 0 | 0 | 0 | 0 | 0 | 0 | 0 | | 7-Spot |
| 0 | 0 | 0 | 0 | 0 | 0 | 0 | 0 | 0 | 8-Spot |
| | | | | | | | | | |
| 0 | 1 | 2 | 3 | 4 | 5 | 6 | 7 | 8 | Number of Hits |

Illustrative Look-up Table for Second Drawn Ball

249

| | | | | | | | | | |
|---|---|---|---|---|---|---|---|---|---|
| 0 | 21 | | | | | | | | 1-Spot |
| 0 | 0 | 1100 | | | | | | | 2-Spot |
| 0 | 0 | 81 | 0 | | | | | | 3-Spot |
| 0 | 0 | 22 | 0 | 0 | | | | | 4-Spot |
| 0 | 0 | 0 | 0 | 0 | 0 | | | | 5-Spot |
| 0 | 0 | 0 | 0 | 0 | 0 | 0 | | | 6-Spot |
| 0 | 0 | 0 | 0 | 0 | 0 | 0 | 0 | | 7-Spot |
| 0 | 0 | 0 | 0 | 0 | 0 | 0 | 0 | 0 | 8-Spot |
| | | | | | | | | | |
| 0 | 1 | 2 | 3 | 4 | 5 | 6 | 7 | 8 | Number of Hits |

Illustrative Look-up Table for Third Drawn Ball

250

| | | | | | | | | | |
|---|---|---|---|---|---|---|---|---|---|
| 0 | 21 | | | | | | | | 1-Spot |
| 0 | 0 | 562 | | | | | | | 2-Spot |
| 0 | 0 | 42 | 22800 | | | | | | 3-Spot |
| 0 | 0 | 11 | 1300 | 0 | | | | | 4-Spot |
| 0 | 0 | 0 | 430 | 0 | 0 | | | | 5-Spot |
| 0 | 0 | 0 | 140 | 0 | 0 | 0 | | | 6-Spot |
| 0 | 0 | 0 | 46 | 0 | 0 | 0 | 0 | | 7-Spot |
| 0 | 0 | 0 | 0 | 0 | 0 | 0 | 0 | 0 | 8-Spot |
| | | | | | | | | | |
| 0 | 1 | 2 | 3 | 4 | 5 | 6 | 7 | 8 | Number of Hits |

FIG. 8

DYNAMIC PAYTABLE FOR INTERACTIVE GAMES

CROSS REFERENCE

The present patent application is a continuation of non-provisional patent application Ser. No. 10/273,440, now U.S. Pat. No. 7,628,691, entitled A DYNAMIC PAYTABLE FOR INTERACTIVE GAMES, filed Oct. 16, 2002, which claims the benefit of provisional patent application entitled Dynamic Paytable Gaming Method and having Ser. No. 60/348,114 filed Oct. 17, 2001.

FIELD

The present invention is related to a gaming system and method for generating a paytable for a variety of different interactive games.

BACKGROUND

With respect to gaming devices, dynamic paytables have been used to attract players to games and to hold on to or keep players wagering at the games. One such gaming device that has a dynamic paytable is a slot machine. In operation, the slot machine selects a paytable from a set of paytables based on the number of coins inserted into the slot machine or selects a paytable based on the state of the slot machine, i.e. bonus game. The slot machine's dynamic paytable is designed to take advantage of the observation that players are more apt to play gaming machines for longer periods of time if the payout is increased as the player continues to play the game.

Other slot machines change the paytable based on the amount wagered by the player. For example, if a player only puts one coin into a coin slot before pulling the handle then a first paytable is selected. If the player inserts two coins, then a second paytable is selected. If the player inserts three coins, then the player has an opportunity to win a much larger prize such as a "progressive" award. A progressive award is an award that is pooled from a number of different networked machines.

Dynamic paytables are not confined to slot machines. Video poker machines also use dynamic paytables as do conventional table games such as black jack, roulette or craps.

SUMMARY

A gaming system and method that includes a dynamic paytable is described. The method operates by enabling a game session that includes a plurality of game events. After each game event, the player is given an opportunity to terminate or continue the game session. The player can use skill to determine whether to terminate or continue the game session. A paytable determines whether a prize is awarded to said player after each game event. In one embodiment, the dynamic paytable is displayed on a player interface. During the game session, the player may terminate the game session before the remaining game events are completed. The player is provided with an opportunity to view the paytable and can generate a strategy to maximize the prize awarded or minimize losses generated during the game session.

The gaming system includes a processor, a memory and an input component. The processor is configured to display the game session which includes a plurality of events. The memory is operatively coupled to the processor and includes a paytable associated with each event. The input component operatively coupled to the processor. The input component is configured to permit the player to optimize the prize by terminating the game session before completing the remaining game events.

BRIEF DESCRIPTION OF THE DRAWINGS

Embodiments are shown in the accompanying drawings:

FIG. 5 is an illustrative interface displaying the setting of a graduated weighting function.

FIG. 6 is an illustrative interface displaying the setting of pay allocations.

FIG. 8 is an illustrative example of a look-up table for an illustrative keno game.

DESCRIPTION

In the following detailed description of the preferred embodiments, reference is made to the accompanying drawings, which form a part of this application. The drawings show, by way of illustration, specific embodiments may be practiced. It is to be understood that other embodiments may be utilized and structural changes may be made without departing from the scope of the present claims.

Illustrative Gaming System

Figure 1A:
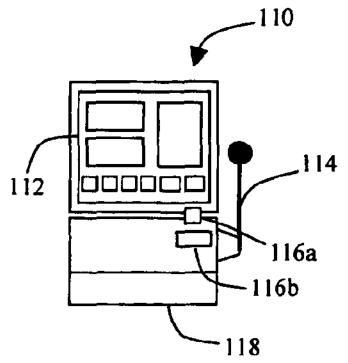
FIG. 1A is an illustrative stand-alone electronic device configured to play a game.

Referring to FIG. 1A there is shown an illustrative stand-alone device 110 configured to provide a player with an interactive gaming system and method. In the illustrative embodiment, the stand-alone device 110 is an electronic device that has a touch screen video display 112 which displays a player interface. Other electronic devices that could be used to provide an interactive gaming experience include a computer having interactive gaming software, a personal digital assistant, a cell phone, or any other such device or combination of devices that displays the interactive game. As shown, the illustrative stand alone device 110 also includes a handle 114 that acts as a player interface component. The function of handle 114 may be similar to the function of a handle in a conventional slot machine.

Additionally, the illustrative stand alone device 110 includes a monetary input component that is configured to receive money or transferable credits, respectively. The illustrative monetary input component 116*a* is a device adapted to receive coins, and the illustrative monetary input component 116*b* is a device adapted to receive transferable credits. The transferable credits may be provided by a coupon based system. Other monetary input components may be configured to receive bills, credit cards, debits cards, smart cards, electronic currency and other such means for transferring money or credits.

A coin hopper 118 is used to distribute an award to the player. It shall be appreciated by those skilled in the art that any other components for distributing awards may also be used instead of the coin hopper 118. These other components for distributing awards include a paper coupon, a smart card, a mag stripe card, or any other such means that can record the transfer of money or credits to the player.

Figure 1B:
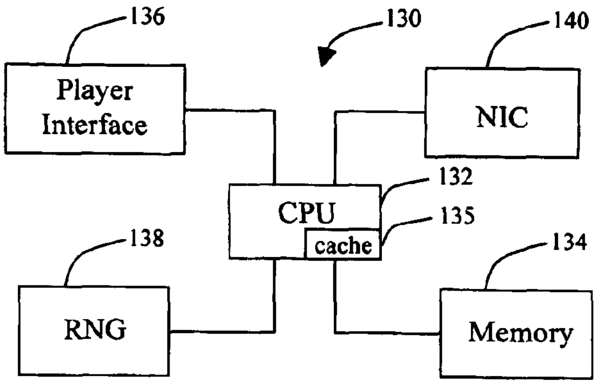
FIG. 1B is an illustrative block diagram of the stand alone electronic device in FIG. 1A.

Referring to FIG. 1B there is shown an illustrative block diagram of the stand alone device 110. The system 130 for the stand alone 110 device includes a logic component that is operatively coupled to internal components that manage the various gaming systems and operations for the interactive game. In one embodiment, the electronic device may be a computer in which the logic component is a central processing unit (CPU) 132 and a memory 134 that stores the gaming operations and processes of the interactive game. A fast memory cache 135 may also be employed by the CPU 132 to more efficiently access data or software stored in the memory 134. It shall be appreciated by those skilled in the art that the memory cache is a memory that is resident on the CPU 132. Additionally, it shall be appreciated by those skilled in the art that logic component does not have to be a CPU and may include a plurality of logic gates and switches that are either programmed, e.g. a field programmable gate array, or may be an application specific integrated circuit (ASIC).

Additionally, in the illustrative embodiment a player interface 136 is operatively coupled to the CPU 132. As previously described the player interface 136 may include a touch screen video display 112 and a handle 114. Alternatively, the player interface 136 may also include a video display (not shown) having a plurality of switches (not shown) that permit the player to interact with the stand alone device 110. Another alternative player interface 136 is a computer monitor (not shown) having a keyboard or mouse (not shown). Preferably, the player interface includes a monetary input component as described above. Thus, the player interface 136 includes any interface that permits the player to interact with the stand alone system and input desired gaming parameters.

In an illustrative embodiment, a random number generator 138 is a software module used in the selection of at least one game selected symbol from a set of game symbols during a game event. The game event is defined as a period during which the at least one game selected symbol is picked from the set of game symbols. A game session is comprised of a plurality of game events. The set of game symbols includes numbers, letters, geometric figures, animated figures or any combination thereof. In the illustrative embodiment, the random selection of a game selected symbol involves generating a random number and using the random number as a basis for picking at least one game selected symbol from within the set of game symbols. It shall be appreciated by those skilled in the art that the random number generator is typically a software program that is stored in the memory 134 and processed by CPU 132.

Alternatively, the picking of at least one game selected symbol from the set of game symbols may be simulated using systems and methods that provide the appearance of a random selection. By way of example and not of limitation, the appearance of random selection can be created using well known "lottery" based systems and methods.

In another embodiment, the stand alone device 110 may include a network interface card (NIC) 140 that permits the stand alone device 110 to communicate with a plurality of other devices configured to play the interactive game. The NIC 140 uses well known networking protocols to communicate with other networked devices. These well known protocols include Ethernet type protocol, TCP/IP protocols or other such network protocols. Additionally, the stand alone devices maybe networked to provide access to a progressive jackpot. The progressive jackpot is a shared jackpot generated from the network of game devices.

Figure 2:
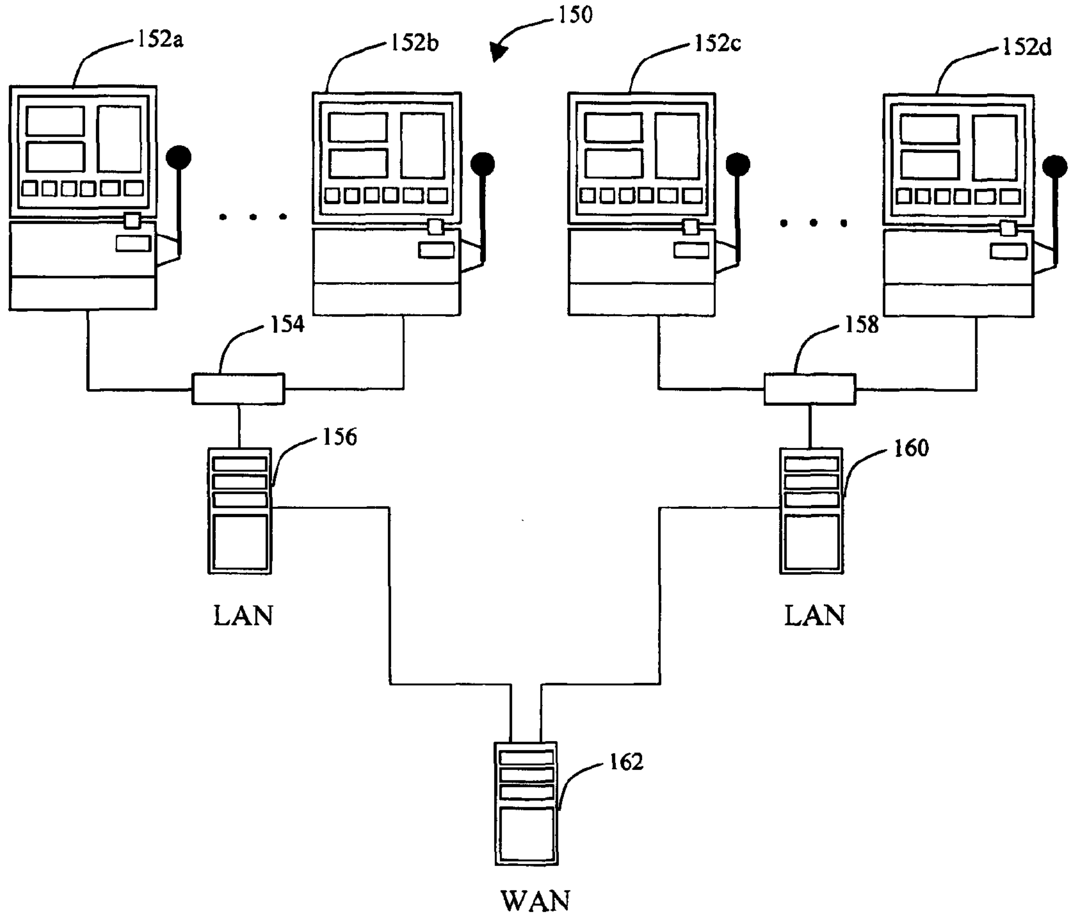
FIG. 2 is an illustrative network system having a plurality of networked electronic devices.

Referring to FIG. 2 there is shown an illustrative network system 150 having a plurality of networked devices 152*a* through 152*d*. In one embodiment, the networked devices 152*a* through 152*d* are similar to the stand alone device 110. In the illustrative network system 150, the networked devices 152*a* through 152*b* are operatively coupled to a node 154 that communicates with a local area network (LAN) server 156. Additionally, the networked devices 152*c* through 152*d* are also operatively coupled to a node 158 that is communication with a LAN server 160. The nodes 154 and 168 may be a hub, router, bridge, gateway or any combination thereof that allows communications between the networked devices. It shall be appreciated by those skilled in the art that each LAN may operate independently of the other.

A wide area network (WAN) is created by linking the LANs together. For illustrative purposes only, both LANs communicate with a WAN server 162. For purposes of this disclosure, it can be appreciated that the distinction between a LAN and WAN is primarily geographic in nature. The LAN is geographically limited to a bank of illustrative stand alone devices that may be resident on the casino floor. A WAN permits banks of networked devices from different casino locations to be networked. A primary purpose for networking the gaming devices is to generate a progressive jackpot. Additional reasons for networking include accounting, diagnostics, player tracking and loyalty programs.

An alternative embodiment to the illustrative network system 150 comprises having the game logic for the interactive game resident on a central server. The central server may be either the LAN server 156 or WAN server 162. During game play, the server then communicates game outputs to the appropriate client, i.e. one of the networked devices 152*a* through 152*d*. Yet another embodiment includes having the central server pick the game selected symbols and submit the game selected symbols to each of the clients on the network.

Interactive Gaming Method

Figure 3A:
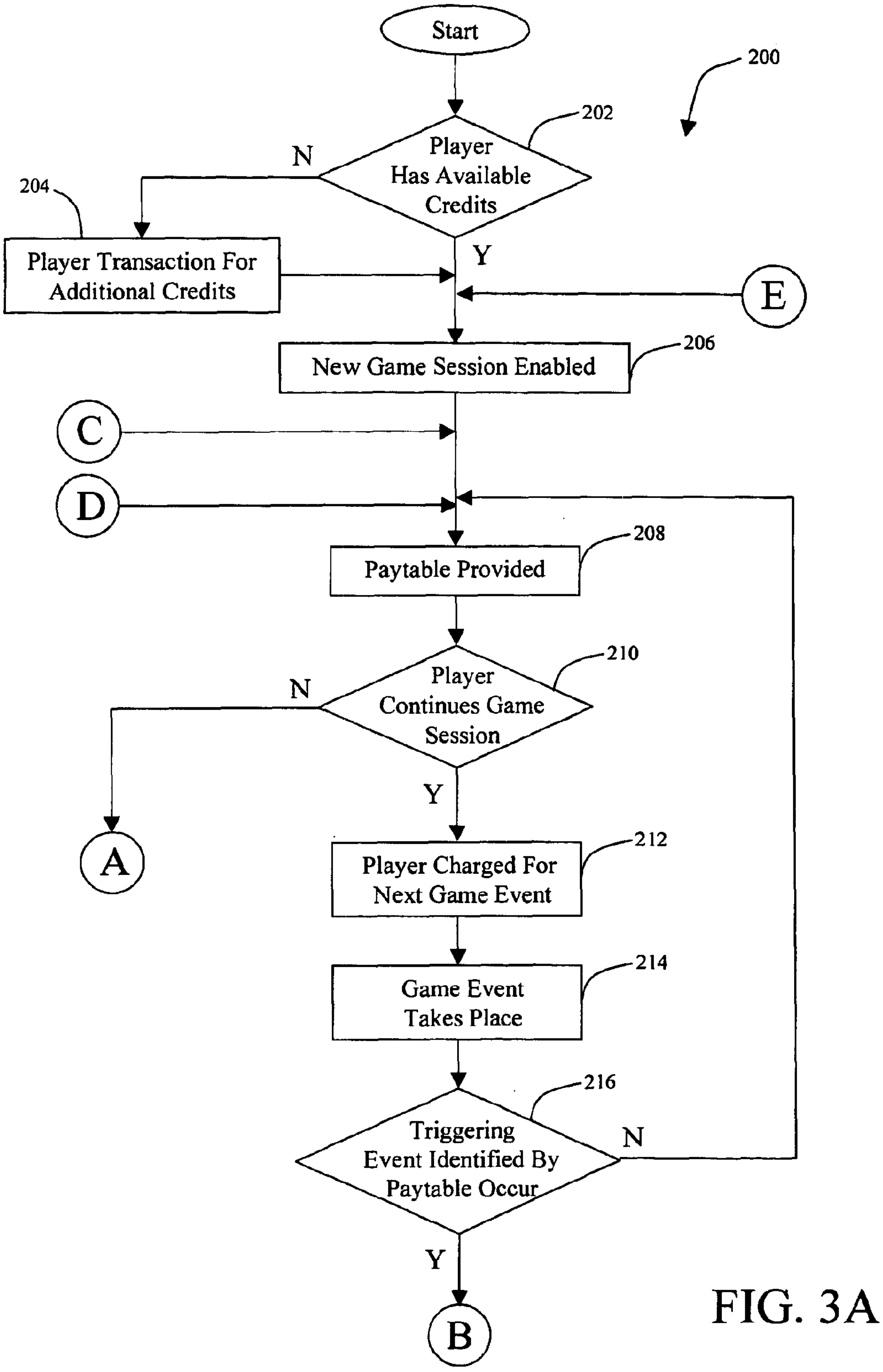
FIG. 3A and FIG. 3B is a flowchart of a method for conducting a game session.
Figure 3B:
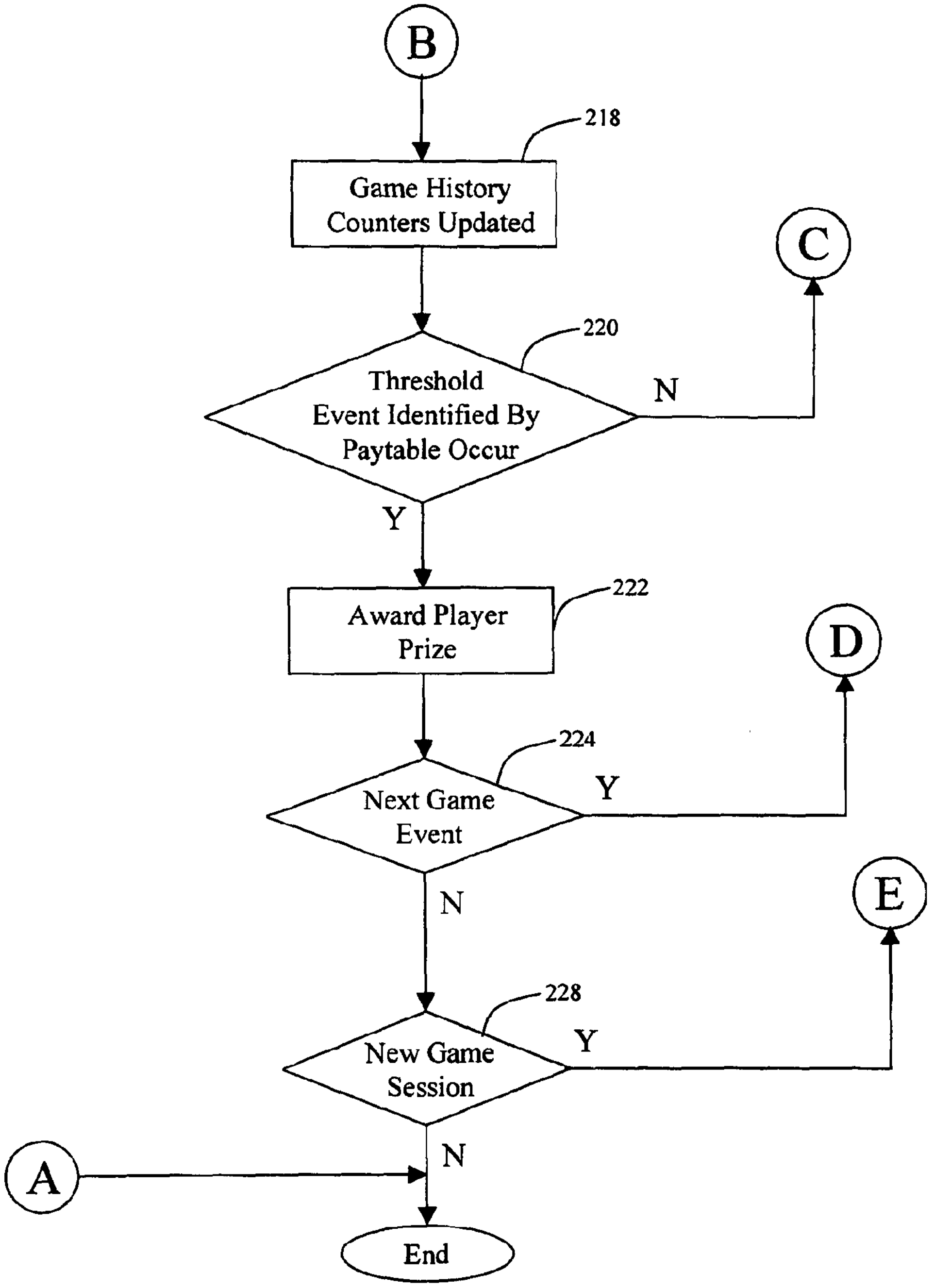

FIG. 3 is a flowchart of a method for playing an interactive game. For illustrative purposes the interactive game is a modified keno game. However, the interactive game may also be a modified bingo game, slot machine game, or any other game that relies on the appearance of random events to award a prize to the player. As described below, the interactive game provides a player with the opportunity to end the game session early, thereby adding a knowledge based skill component that was not available to games that rely solely on random events.

The method 200 for playing the interactive game is initiated at decision diamond 202 in which the determination is made whether the player has available credits. If the player does not have sufficient credits, the method proceeds to process block 204 in which a player transaction for additional credits is performed. The transaction for additional credits includes the inserting of money using coins or currency or the providing of transferable credits derived from coupons, a smart card, a player account, a credit account, or any other such accounts that receive credits or currency. Available credits are needed to enable the new game session for the interactive game as described in block 206.

When a new game session is initiated at process block 206, the player identifies the game conditions for the game session. The type of game condition or conditions depend on the particular type of game. In an illustrative "modified" keno game which is also referred to as an interactive keno game, a first game condition requires a player's selection of a plurality of keno spots. As can be appreciated by a player with ordinary skill in the art of playing a keno game, a player selects integers, i.e. spots, from a range of integers 1 through 80. These selected integers are referred to as "spots". Thus, if a player selects five integers, then the player has provided the game condition for a five-spot keno game.

Another game condition is the number or amount of credits the player is going to be "charged" for each game event as identified in process block 212. For the illustrative modified keno game, the game event includes having the interactive keno game draw an integer or "ball" from the range of integers 1 through 80. For example, the player may decide to be charged a nickel of $0.05 cents for each ball drawn during a game event. The process of charging a player for each game event is referred to as a "chargeable action".

Yet another game condition that can be input by the player includes identifying whether to draw keno balls in "sets". The drawing of keno balls or integers in sets refers to the drawing of more than one ball at a time. For example, the player may elect to draw three balls at one time. Thus, during an illustrative game session, the interactive keno game draw three balls during each game event.

A further game condition includes automating portions of the decision making process of the method 200. By way of example and not of limitation, the game is played in an automated mode which can only be paused by the player. In another illustrative example, the game can be played in a semi-automated mode in which the game is only paused once the player is awarded a prize or when the player decides to pause the game session. In yet another illustrative example, the game is played in a manual type mode in which the game session is paused after each game event.

After initiating the game session, the method then proceeds to process block 208 in which a paytable is provided. The prizes in the paytable are typically dependent on the conditions input by the player in process block 206. The paytable indicates the prizes awarded to the player. In the illustrative keno embodiment, the paytable is modified as a function of variables which include: the number of player selected spots; the number of player spots matching the keno balls drawn; the amount of player credits wagered during each game event; and the number of game events performed. An illustrative paytable is described in further detail in FIG. 4 below. Alternatively, the paytable may be static paytable that does not change for each game event. The method then proceeds to block 208.

In one embodiment, the paytable can be displayed on the player interface during the game session. In an alternative embodiment, the paytable is stored in the illustrative electronic gaming device 110 due to the limited viewing area provided by the player interface. In the alternative embodiment, the player can view the paytable at the player request. As described in further detail below, the paytable is stored as a look-up table or can be stored as an equation. The method then proceeds to decision diamond 210.

At decision diamond 210, the method calls for the player to determine whether to continue the game session. The decision to continue can be made based on analyzing the paytable provided in process block 208, and a plurality of game history counters that are specific to the interactive game. The game history counters track various events that have occurred during the game session. By way of example and not of limitation, an illustrative game history counter includes an available credit counter which counts the number of credits that are available during the game session.

The decision the player makes at decision diamond 210 requires the player to decide whether to conclude the game session or continue the game session. The determination of whether to conclude the game is based on the player's skill in analyzing the paytable and any counters that monitor the game session. The player's skill can be used to terminate the game session after an optimal event has occurred or at an optimal time period. The player has the opportunity to evaluate a plurality of strategies for preserving winnings and/or reducing losses. If the player decides to end the game session, then the player is provided with the available credits and the game session is terminated.

If the player decides to continue the game session, the method then proceeds to process block 212 in which the player is charged before engaging the next game event. The player is charged according to the game conditions identified when a new game session was enabled in process block 206. The combination of charging the player for performing the next game event and then proceeding with the performance of the game event is the "chargeable action".

At process block 214, the game event is performed. Again the type of game event performed is particular to the type of game being played. For the illustrative interactive keno game, the game event includes drawing a keno ball from the range of integers 1 through 80. Alternatively, more than one keno ball, i.e. a set, can also be picked during each game event. For the interactive keno game, the charging of the player and then the drawing of at least one keno ball is the chargeable action. In one embodiment, each keno ball is drawn only once during a game session.

The method then proceeds to decision diamond 216 in which the determination is made whether a triggering event has occurred. A triggering event is a game event that satisfies a predefined game condition which "triggers" a game history counter. If a triggering event does not occur at decision diamond 216, the method then returns to process block 208 in which the paytable is provided that identifies prizes for the next game event.

If a triggering event does occur then the method proceeds to process block 218 is which at least one game history counter 218 is updated. The game history counter is used to determine if a player is owed an award according the paytable provided in process block 208. For the illustrative interactive keno game, assume that the player has elected to play a five-spot keno game and has selected "numbers" 24, 30, 35, 52 and 61. For this particular example, the triggering event occurs when one of the balls drawn during a game event matches one of the player spots. Therefore, if the first ball drawn is a 54, the second ball drawn is a 71, and the third ball drawn is a 35, then the triggering event occurs when the third ball is drawn. As a result of the triggering event, a game history counter is updated to show that 1 out of 5 matches has occurred. After the game history counter is updated the method proceeds to decision diamond 220.

At decision diamond 220 the determination is made whether a threshold event identified by the paytable has occurred. The threshold event determines whether a particular game event or triggering event results in awarding the player a prize. If the threshold event identified by the paytable determines that the player is not entitled to a prize, the method returns to process block 208 in which the paytable is provided and the player determines whether to continue the game session. In the illustrative example, the game history counter has been updated to show that due to the third ball drawn matching one of the player selected numbers, 1 out of 5 matches has occurred. If it is assumed that for the five-spot game at least 3 out of 5 matches are needed to award the player a prize, then the player having only 1 out of 5 matches is not entitled to a prize.

If at decision diamond 220 the determination is made that a threshold event has occurred then the player is awarded a prize as reflected by process block 222. The prize is defined by the paytable provided in process block 208. For the illustrative five-spot keno game, if the game history counter indicates that the player has matched 5 out of 5 player selected numbers, then the player is awarded a prize according to the paytable. After the player is awarded a prize, the method then proceeds to decision diamond 224.

At decision diamond 224, a determination of whether to continue to the next game event is made. If the determination results in continuing to the next game event, the method returns to process block 208. If the decision results in not performing the next game event, the method proceeds to decision block 228. The determination of whether to continue with the next game event can be made by the player or can be subject to the rules of the game being played. For example if no more game events can be played during a game session, then the game session is effectively terminated. In the illustrative interactive keno example, if the player has matched 5 out of 5 player selected numbers for a five-spot keno, then the game session is effectively over and the player must proceed to decision diamond 228. In another illustrative interactive keno example, if the player has matched 4 out of 5 player selected number for a five-spot keno game, the player must decide whether to continue to the next game event or to terminate the game session.

The player decision at diamond 224 requires the player to decide whether to continue the game session or end the game session. As in process block 210, the determination of whether to conclude the game is based on the player's skill in analyzing the paytable and any counters that monitor the game session. The player's skill can be used to terminate the game session after an optimal event has occurred or at an optimal time period. The player has the opportunity to evaluate a plurality of strategies for preserving winnings and/or reduce losses. If the player decides to end the game session, then the player is provided with any available credits and the game session is terminated.

At decision diamond 228, the decision is made to play a new game session or to end the game altogether. If the decision to start a new game session is made, the method returns to process block 206 and the player enters the conditions for the game session. If the decision is made to end the game, then any available credits are transferred to the player.

It shall be appreciated by those having ordinary skill in the art that during a game session, a determination of whether the player has sufficient credits to continue playing the interactive game is constantly made. If the player has insufficient credits, the player is permitted to transfer credits to the game to continue the game session. However, if the player has no available credits then the game session is terminated.

Figure 4:
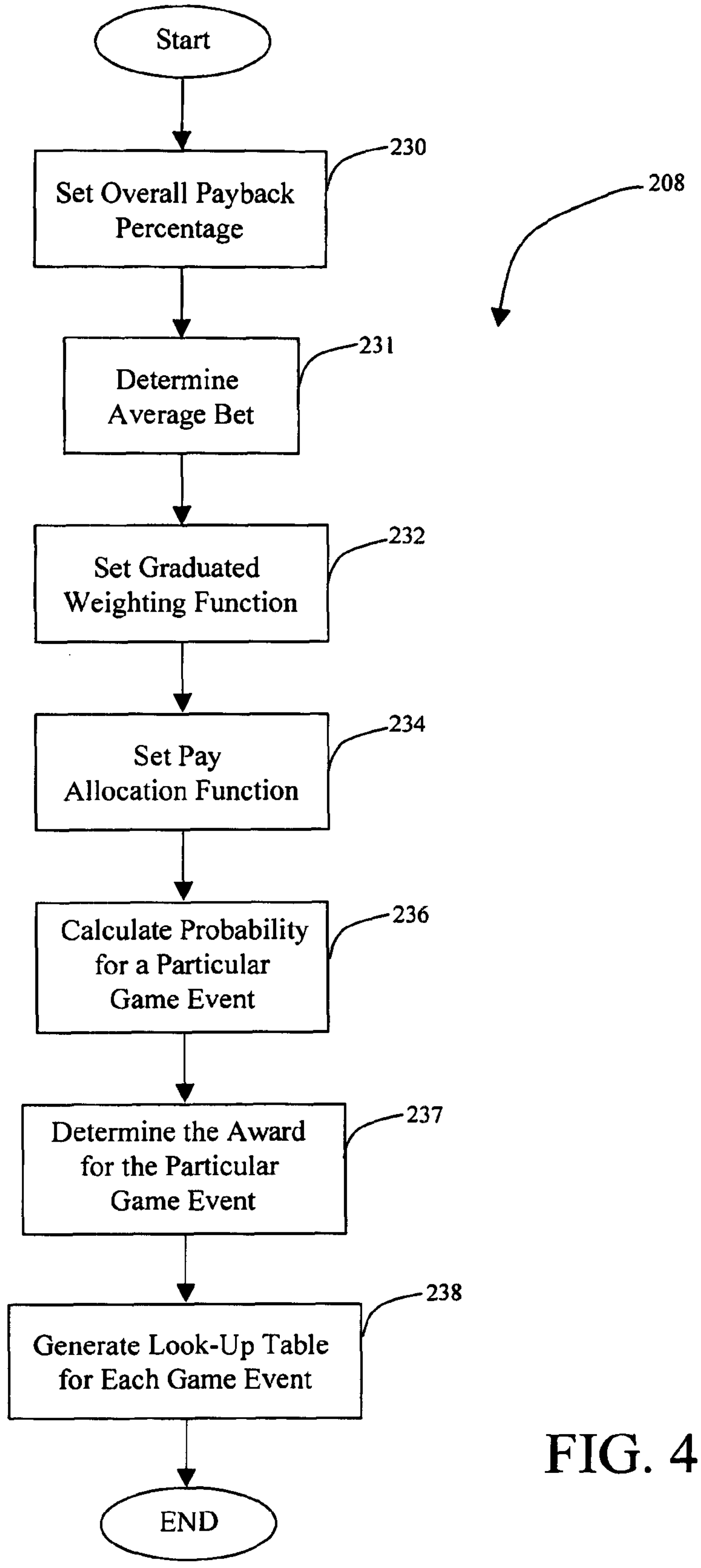
FIG. 4 is a flowchart of one embodiment for generating a paytable.

Referring to FIG. 4 there is shown a flow chart of a first embodiment for generating a paytable. In this first paytable embodiment, the paytable usually changes for each game event. For the illustrative interactive keno game, the paytable can be modified as a function of variables that include: the number of player selected numbers, i.e. spots; the quantity of integers, i.e. balls, drawn from range of integers 1 through 80; the amount of player credits charged for each game event; the total quantity of chargeable actions performed; the total number of game events; and the contribution or allocation for each award level to the overall payback.

In the first paytable embodiment, one variable used to generate the paytable from process block 208 is the overall payback percentage. The overall "payback" percentage for the game is set at process block 230. In the first paytable embodiment, the overall payback percentage remains constant. By way of example and not of limitation, the paytable may be programmed to provide a constant 90% payback to the player. Generally, the payback percentage for the interactive game is determined by the operator, e.g. a casino. For purposes of this disclosure, the payback percentage is referred to as ROI which stands for Return On Investment.

At process block 231, the average bet is determined based on the structure of the game. The average bet is the average of the total amount wagered for a plurality of game sessions. For the average bet determination, each game session is taken to completion without player interruption. Recall the player can terminate the game session after each game event as described above. The average bet may be determined empirically or theoretically. For the interactive keno game, the average bet is a function of the number of "spots" picked by the player, thus the average bet for a five-spot game will be different than the average bet for a four-spot game. For purposes of this disclosure the average bet is referred to as ABET. The method then proceeds to block 232.

At process block 232 the graduated weighting function is set for the first paytable embodiment. The graduated weighting functions is used to more heavily weight the probabilities in the player's favor for game events that occur at the end of the game session. For the illustrative interactive keno example, an illustrative graduated weighting function may be a formula as shown below:

$$WGT(I)=(I+39)/80$$

The variable "I" in the weighting function refers to the number of game events that have been played. Thus, if only one game event has occurred then the graduated weighting function is 0.50, and if sixty-one numbers are picked by the game then the graduated weighting function is 1.25.

Another illustrative graduated weighting table is shown in FIG. 5. The graduated weighting table 240 of FIG. 5 has a start percentage and a stop percentage associated with the number of spots played. The start percentage is lower than the stop percentage so that the player will have a greater incentive to play the interactive keno game longer. The actual graduated percentage for each game event increases in a linear fashion from the start percentage to the stop percentage.

In process block 234, a pay allocation is set. In the illustrative keno game, the pay allocation determines the percentage of the total prize awarded for each threshold event. By way of example and not of limitation, the pay allocation for a five-spot keno game may not distribute a prize for having one drawn ball match one out of five player selected numbers. If there are two drawn balls that match two out of five of the player selected numbers, then the player is awarded 20% of the total prize. If there are three drawn balls that match three out five of the player selected numbers, the player is also awarded 20% of the total prize. If four of the drawn balls match four out of five of the player numbers, the player is awarded 30% of the total prize. For a complete five spot match, the player is awarded the remaining 30% of the total prize. It shall be appreciated by those skilled in the art that the pay allocation weighting function is used because of the dependent nature of the game events in the interactive keno game. For purposes of this disclosure, the allocation weighting function is referred to as AL(IHIT).

Referring to FIG. 6 there is shown a more detailed table 242 in which the pay allocation weighting is set for the interactive keno game. The set pay allocations table 242 includes hits columns 243 and a spots marked rows 244. The spots marked rows 244 refer to the different interactive keno games that can be played based on the total player selected numbers. The hits columns 243 identifies the number of "hits" or matches associated with each of the spots marked. The percentage of the prizes awarded are identified by the appropriate cells. For example for the five-spot game shown in FIG. 6, the player is awarded a prize for hitting 3, 4, and 5 of the spots marked. The percentage of the total prize increases from 19% for hitting 3 out 5 spots, to 20% for hitting 4 out of 5 spots, and finally 60% for hitting 5 out of 5 spots.

At block 236, the probability for the next game event is calculated. It shall be appreciated by those of ordinary skill in the art having the benefit of this disclosure that the probability of a next game event is the product of probabilities of prior game events multiplied by the probability associated with the next game event. In an illustrative one-spot game, the probabilities are calculate by determine the probability of not hitting a spot multiplied by the probability that the spot will be hit. For an illustrative five-spot game, the probability of hitting the fifth spot is determined by calculating the probability of hitting four out of five spots times the probability of hitting the fifth spot in the next game event. For purposes of this disclosure, the probability for the next game event is referred to as PR(I).

At block 237, the award for the each game event is determined. The prize awarded is given by the equation provided below:

$$\mathrm{PAY}(I)=\mathrm{ROI}*A\mathrm{BET}*\mathrm{WGT}(I)*AL(I\mathrm{HIT})/PR(I)$$

For purposes of the equation, the prize awarded is referred to as PAY (I).

Figure 7:
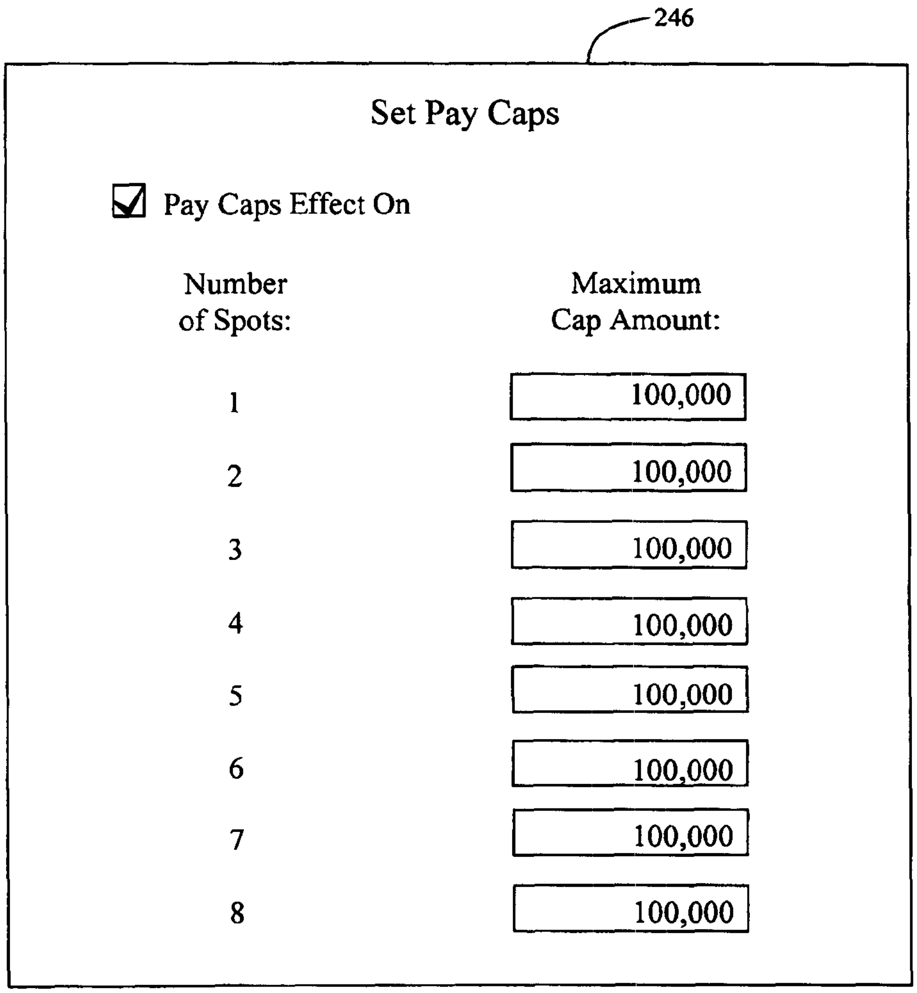
FIG. 7 is an illustrative interface displaying the setting of pay caps.

The amount of the prize awarded can also be capped. Referring to FIG. 7 there is shown a table 246 in which pay caps have been set. The table includes a column heading titled Maximum Cap Amount. The purpose of the pay cap is to ensure that the prize awarded does not exceed the maximum cap amount. The method then proceeds to block 238.

At block 238, a plurality of look-up tables are generated for each game event. The look-up tables determine the prize awarded for each game event. The look up table is generated using the formula from process block 237. Referring to FIG. 8, there is shown three illustrative look-up paytables that are generated using the method described in FIG. 4. An illustrative look-up table 248 is associated with the drawing of the first keno ball. The table 248 includes a column that identifies the type of game being played, e.g. one-spot, two-spot, etc. As previously mentioned, the one-spot game is an interactive keno game in which the player has chosen only one number. Table 248 also includes a row that identifies the number of hits. As previously mentioned a "hit" occurs when there is a match between the drawn ball and one of the player selected numbers. Table 248 indicates that for a 1-spot game, if the first ball drawn matches the player selected number, then the player is entitled to an award of 20 credits. The table 249 is an illustrative look-up paytable associated with the second game drawn ball. The table 250 is an illustrative look-up paytable associated with the third drawn ball. Note, that the illustrative look-up tables provide an upper limit for number of spots a player can elect to play, namely, only up to eight spots may be chosen by the player during the game session.

Interactive Keno

Figure 9:
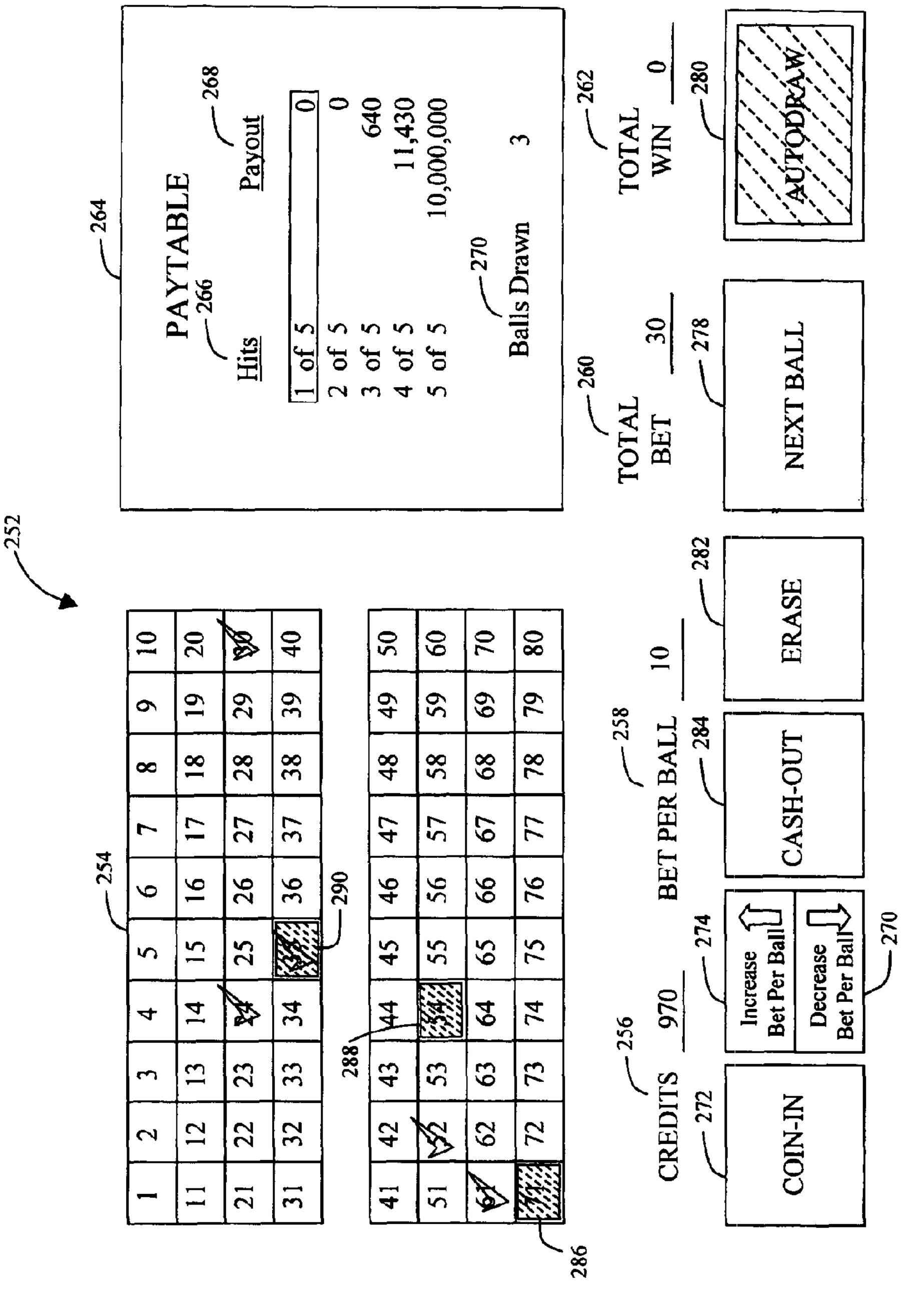
FIG. 9 is an illustrative example of a player interface for a modified keno game.

Referring to FIG. 9, there is shown the illustrative player interface for the interactive keno game described above. The interactive keno game is described in further detail in patent application Ser. No. 10/214,862, titled Interactive Keno Gaming System and Method, filed Aug. 7, 2002, which is hereby incorporated by reference. The illustrative keno embodiment includes a player interface 252.

The illustrative player interface 252 operates on the illustrative touch screen display 112 of FIG. 1. The touch screen 112 displays the interactive keno game that is configurable by the player. Preferably, the interactive keno game displays one game session at a time. During each game session the player selects the "spots" to play. The game session requires the picking of at least one integer from the range of integers 1 through 80. Each game session is made up of at least two game events. During each game event at least one integer, i.e. ball, is drawn from the range of integers 1 through 80. A chargeable action is performed during each game event.

In the illustrative embodiment, a game session is initiated when the player provides money or transferable credits as described above. Once player credits are received by the interactive gaming system, the game session is initiated and a card component 254 is displayed. The player then proceeds to select numbers or spots from the card component 254. By way of example and not of limitation, the five numbers selected are 24, 30, 35, 52 and 61. Each of these numbers are identified with a check mark on card component 254.

After the card component 254 is displayed and the player credits are displayed by the credit meter 256, the player identifies the credits that will be applied towards each "chargeable action" with a "Bet Per Ball" meter 258. In the prior art keno game, a player places a wager and selects his numbers, and the game randomly selects 20 numbers. In the present embodiment, the player is charged a predefined number of credits for at least one ball that is picked during the game event. The "Bet Per Ball" meter 256 identifies the condition that determines the predefined number of credits that will be charged to draw at least one ball.

During the game session, a total bet meter 260 provides a summary of the total number of credits wagered by the player during the game session. Thus, the credits that are applied for each chargeable action during the game session are monitored with the total bet meter 260. A total win meter 262 is also provided. The total win meter 262 informs the player of the number of credits that player has been awarded during the game session. Thus, illustrative player interface 252 includes a plurality of meters that monitor each interactive keno game session.

A paytable 264 to the right of card component 254 indicates the possible prizes that may be awarded to the player. The paytable may be a dynamic paytable or a static paytable. The dynamic paytable is a paytable that is modified during the game session as described above. The static paytable is a paytable that does not change during a game session.

In the illustrative embodiment of FIG. 9, the paytable 264 is configured to provide a payout for a five-spot keno game. Additionally, it is preferable that the paytable 264 is comprised of a hits column 266 and a payout column 268. The hits column 266 describes the number of hits needed to receive the payout shown in payout column 268. Furthermore, a balls drawn meter 270 captures an output of the quantity of balls drawn during a game session.

Before initiating a game session, the player must have available credits in the credit meter 256. Credits are transferred to the credit meter using the coin-in button 272. Additionally, before initiating the game session the player must transfer credits from the credit meter 256 to the bet per ball meter 258.

The player transfers credits from the credit meter 256 using the increase bet per ball button 274 or the decrease bet per ball button 276. The increase bet per ball button 276 increases the number of credits that are shown by the bet per ball meter 258 and the decrease bet per ball button 276 decreases the number of credits that are shown by the bet per ball meter 258.

After the game session conditions of having the player select at least one game number, and having the player provide the wager for each game event, the game event process of drawing keno balls is initiated. In the interactive keno game, a chargeable action occurs when either the next ball button 278 or the autodraw button 280 is activated. The next ball button 278 engages the drawing of keno balls. The player may also initiate the game session using the autodraw button 280. The autodraw button 280 is configured to automatically pick at least one ball during each game event until the at least one ball matches at least one player selected number. In one embodiment, the autodraw sequence is paused if there is a match between the player selected number and the game picked number. Additionally, the game session may be paused manually by the player after each game event.

Before activating the next ball button 278 or the autodraw button 280, the player has an opportunity to view the paytable 264. In one embodiment, the paytable 264 is revised during the game session. The displayed paytable provides the player with an opportunity to determine if the player payout is satisfactory to the player. The ability to view the dynamic paytable permits the player to use the player's skill to decide whether to continue the game session or terminate the game session. Additionally, the player can view the number of balls drawn meter 270, the total bet meter 260 and the total win meter 262 to determine whether to continue the game session.

By providing the player with a decision making process during the game session, the player can use the player's skill to preserve winnings and minimize losses. By preserving winnings and minimizing losses, the player can enjoy playing the interactive keno game for a much longer period of time. If the player did not possess knowledge based skill to preserve winnings and minimize losses, the novice player would spend his available credits much faster than a knowledgeable player.

Additionally, the player may reset the game using the erase button 282. The erase button 282 begins a new game session. Finally, should the player decide that they want to conclude the game, the cash-out button 284 button is activated. The cash-out button 284 transfers credits or money to the player using well-known techniques that include depositing coins in a coin hopper or transferring credits or money to a coupon that is redeemable at other machines or kiosks.

During the game session, the player may also be awarded an intermediary prize after a game event. The intermediary award is then be transferred to the credit meter 256 so that the player may apply the newly awarded credits towards continuing the game session. In the autodraw embodiment, the game session is paused after the intermediary prize is awarded and the player is provided with an opportunity to determine whether to continue the game session. The awarding of an intermediary prize adds a heightened level of player interactivity because the player may decide to end the game session after the intermediary prize is awarded.

The card component 254 displayed in FIG. 6 provides an illustrative example of the effects associated with having enabled the autodraw 280 function. In the illustrative example, the game was paused because there was a match between one of the drawn keno balls and one of the player selected numbers. The drawn keno balls are 71, 54 and 35 and the number 71 was drawn first, the number 54 was drawn second, and the number 35 was drawn third. The drawn keno balls are identified with markings 286, 288, and 290 for numbers 71, 54, and 35, respectively.

During each game event of this game session, the chargeable action of picking one game selected symbol required withdrawing 10 player credits from the credit meter 256. On the first drawing the game picked number was 71. Since there was no match with the player selected numbers, the player lost the credits and the total bet credit meter was revised to show that 10 player credits had been played. For the dynamic paytable embodiment, the dynamic paytable was then revised. On the second drawing, the player wagered another 10 credits for the chargeable action of drawing the next keno ball. The next keno ball was 54 and again there was no match with the player selected numbers. Again the player credits were lost and the total credit meter was revised to 20. Preferably, the paytable was again revised and generated the paytable output shown in paytable 264.

Since the player was in "autodraw" mode, 10 more player credits were charged to the player for the next drawn keno ball. During this game event, the drawn keno ball is 35 which results in a match with the player selected number. Since a match has been made, the player may be entitled to a payout. The occurrence of this match is also referred to as a "triggering event" as described above. The paytable 264 indicates with the highlighted vernacular that the game history counter is at "Hit 1 of 5" and the player is entitled to a payout of 0. Regretfully, the player was unable to be awarded a prize because the paytable required more matching numbers. Should the next two game picked numbers match two of the four remaining player selected numbers, the player shall be entitled to an award of 640 credits according to paytable 156. Should the next three game picked numbers match three of the four player selected number, is the player is entitled to an award of 11,430 credits. Finally, should the next four game picked numbers match the remaining four player selected numbers, the player is entitled to an award of 10,000,000 credits where the 10,000,000 represents a pay cap.

In operation, the game session continues until the player decides to end the game, or there are no more credits available in the credit meter 256, or the game session is completed according to the game rules. Should the player decide to end the game session, the player cashes out his remaining credits by using the cash-out key 284. It shall be appreciated by those skilled in the art that the game may include additional functions such as accounting functions, player tracking functions, loyalty functions and the awarding of a progressive jackpot. By way of example and not of limitation, the progressive jackpot may be awarded by matching all player selected numbers with the randomly selected numbers according to a paytable formula for progressive jackpots.

Illustrative Skill Strategy for Interactive Keno

Games distinguish themselves based on the types and levels of player skill. According to Merriam-Webster, one definition of skill includes the ability to use one's knowledge effectively and readily in execution or performance. Another definition of skill includes dexterity or coordination especially in the execution of learned physical tasks.

For purposes of this patent, "player skill" includes three components: minimal skill, dexterity skill, and knowledge skill. Generally, all games include these components, however, the degree of skill varies for each game. Minimal skill refers to the player having a minimal understanding of the rules of the game and minimal dexterity needed to apply the rules of the game. To play any game according to the game rules, the player must possess minimal skill. However, minimal skill is not required since the player can always completely ignore the game rules.

By way of example and not of limitation, a lottery game is a game that in principle only requires minimal skill. The minimal skill required is the selection of numbers from a card having a plurality of numbers. The correct amount of numbers must be identified before the lottery drawing. The game outcome is theoretically random so little or no dexterity skill or knowledge skill is used. Other games that theoretically rely on purely random events include traditional keno, bingo and stand-alone slot machines.

Dexterity skill is based on the player's reflexes or coordination. Most games require a degree of dexterity to establish game play. Certain games such as arcade video games or pinball machines are primarily dexterity based skill games. For example, in the well-known "Pong" video game, the player removes bricks from a wall by causing a ball to "hit" the brick with a player controlled paddle. Dexterity skill is needed to ensure that the ball strikes the paddle so that the player may continue playing the game. The objective during game play is to generate as many points as possible, and this objective is generally achieved by playing the game as long as possible.

Knowledge skill is based on the player's experience and analytical abilities. Most games require a degree of knowledge skill during game play. For example, the Pong game described above requires a certain amount of knowledge skill in anticipating the various game levels. However, this level of knowledge is minimal when compared to the level of dexterity skill applied in Pong.

An illustrative example of a game that uses knowledge skill is a standard video poker game of Jack or Better. In this video poker game a player is provided with a choice of which cards to hold and which cards to discard in exchange for newer cards. The optimum choice made by the player is dependent on the paytable for the video poker game. For illustrative purposes, with a paytable that pays a Royal Flush 800, a Straight Flush 50, Four of a Kind 25, a Full House 9, a Flush 6, a Straight 4, Three of a Kind 3, Two Pair 2 and a Pair of Jacks or Better 1, the player has a theoretical optimum return of 99.5%. Thus, if a player starts with a $20 bill, and wagers $1 at a rate of six games per minute, the loss rate is $1.80 per hour and on average the player could play for 11 hours before consuming all the playing funds.

In the illustrative example of the standard video poker machine, the knowledge skill used by the player is dependent on the amount wagered, the cards initially dealt to the player, the cards discarded by the player, the new cards provided to the player and the paytable for compensating the player. During the game session, the player attempts to optimize his/her award according to the paytable. Since the optimal player outcome is dependent on the paytable, a "knowledgeable" player's decision will be highly dependent on the paytable. The paytable provided in the illustrative standard video poker machine is a static paytable. A static paytable does not change is during the game session.

As described above, a gaming system and method that includes a dynamic paytable is described. The illustrative example for the dynamic paytable includes an interactive keno game in which the player is charged for each game event. Each game event includes the drawing of at least one ball.

As described above, the interactive keno game displays the dynamic paytable to the player after each game event. Additionally, the keno game provides the player with an opportunity to terminate or continue the game session after each game event. In operation, the dynamic paytable may be used to help the player select a strategy that preserves the player's winnings or a strategy that will minimize the player's losses. The player strategy also includes a theoretical optimal strategy in which the player maximizes his/her winnings or minimizes his/her losses during the game session.

Figure 10:
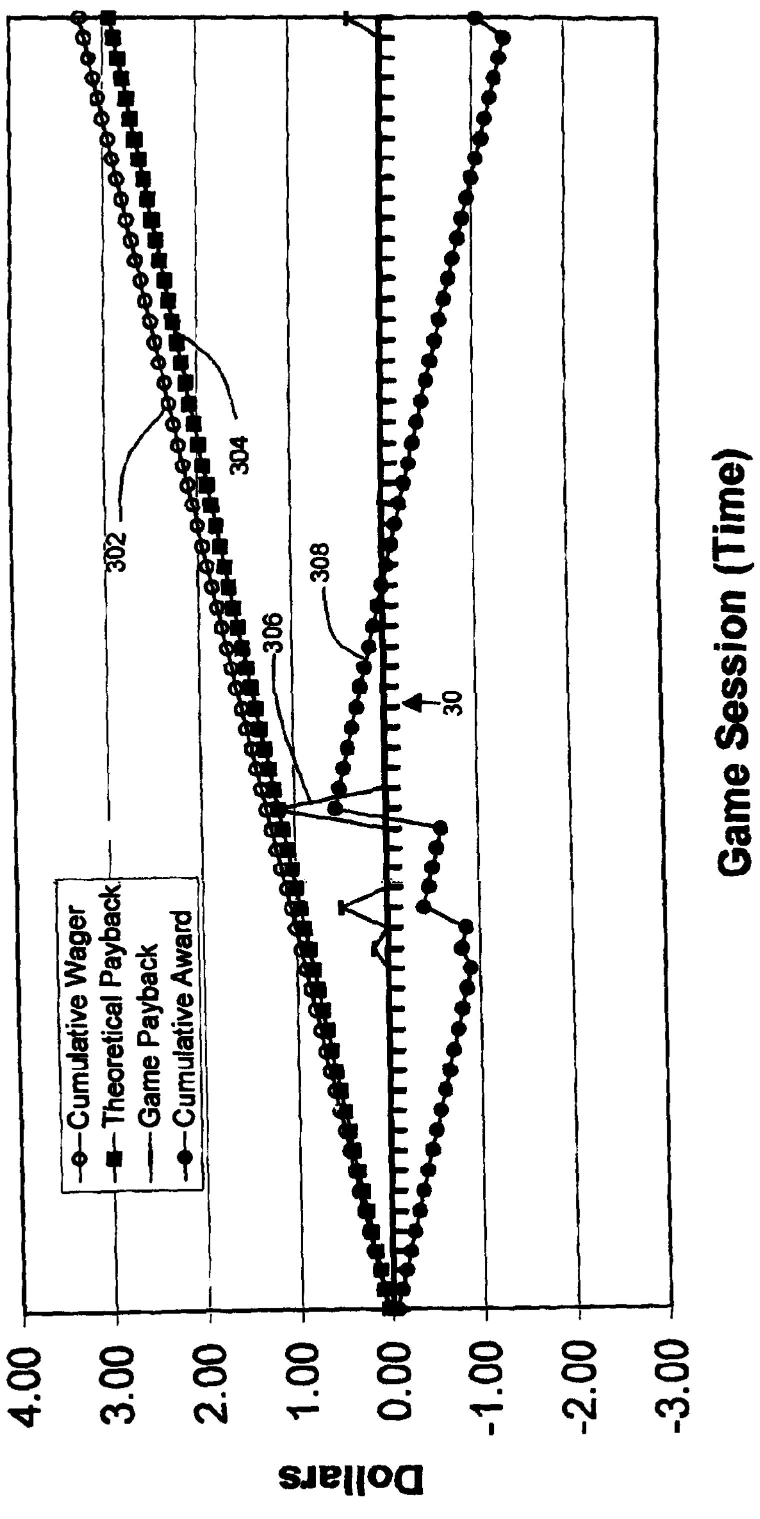
FIG. 10 is an illustrative chart that may be used to develop a player strategy to reduce game losses.
Figure 11:
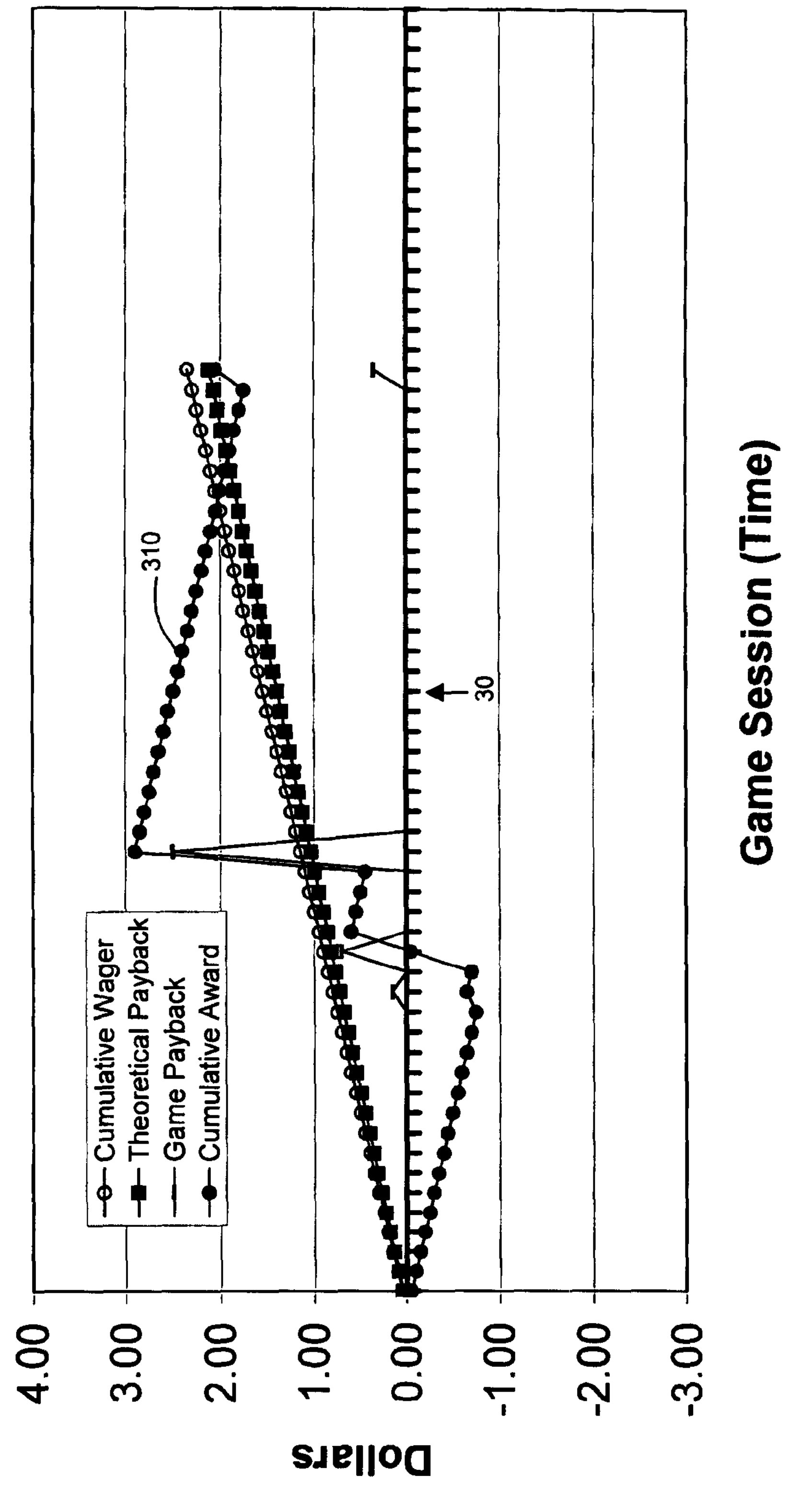
FIG. 11 is an illustrative chart that may be used to develop a player strategy to preserve game winnings.

Referring to FIG. 10 there is shown an illustrative chart that may be used to develop a player strategy to reduce game losses. A first line 302 represents a cumulative wager amount. The cumulative wager amount line 302 tracks the total amount wagered by the player after each game event. For the charts in FIG. 10 and FIG. 11, the illustrative wager amount is $0.05 per game event.

The minimal payback line 304 is a cumulative payback that is made to the player, and is based on the payback percentage for playing the interactive keno game. The payback percentage is based on the use of minimal skill. For illustrative purposes, the payback percentage is 90% for the charts in FIG. 10 and FIG. 11. Thus, the minimal payback for each $0.05 game event is $0.045. The minimal payback line 304 assumes that the payback percentage is fixed for each game event. It shall be appreciated by those skilled in the art, that the minimal payback percentage is developed over the course of playing many game sessions rather than just a single game event.

The current well-known keno games are purely random games that require minimal skill. The minimal payback line 304 is based on the player using minimal skill to play the interactive keno game. For illustrative purposes only, minimal skill play occurs when the player hits the "Autoplay" key until the end of the game session. Knowledge based skill is used to determine when to terminate the interactive keno to either preserve winnings or reduce player losses during a game session.

The interactive keno game is unique because it provides the player with an opportunity to use knowledge based skill to terminate the game session early to preserve winnings or reduce player losses. An illustrative strategy is described below that permits the player to exceed the 90% payback associated with minimal skill.

The game payback line 306 identifies the prize that was awarded to the player during the illustrative 5-spot keno game session. As shown by game payback line 306, the player was awarded a prize at game event 18, 20, 25, and 64 because the player "hit" a number. The terminology of "hitting" a number refers to drawing a keno ball that matches a player selected number. The $0.15 prize at game event 18 represents the award for a 5-spot keno game in which the player hits 2 of 5 player selected numbers. Note, that there is no prize awarded for the player hitting 1 of 5 is player selected numbers. The $0.50 prize at game event 20 represents the award for the player hitting the 3 of 5 player selected numbers. The $1.20 prize at game event 25 represents the award for the player hitting 4 of 5 player selected numbers. Finally, the $0.35 prize at game event 64 represents the prize awarded for hitting 5 of 5 player selected numbers.

The cumulative award line 308 is the game payback values represented by game payback line 306 subtracted from the cumulative wager values represented by the cumulative wager line 302. Thus, the cumulative award line 308 represents the total prizes awarded to the player minus the amount charged to the player for each game event. The cumulative award line 308 includes a plurality of spikes generated when the player is awarded the prizes at game event 18, 20, 25, and 64. The cumulative award line 308 shows that the player should have terminated the game session after hitting 4 of 5 player selected numbers.

Based on the pattern generated during the game session displayed in FIG. 10, the player may devise a simple strategy that if the game hits a 4 of 5 player selected numbers in a 5-spot keno game within 30 game events, then the player should terminate the game session. Although, this strategy is not optimal it is a simple strategy that can be readily implemented by the player to minimize his losses and increase the payback percentage. This strategy is a simple knowledge based skill strategy.

Referring to FIG. 10 there is shown an illustrative chart that may be used to develop a player strategy to preserve game winnings. The cumulative award line 310 reflects that the player won prizes at game events 15, 17, 22 and 48. The prize at game event 15 represents the award for the hitting 2 of 5 player selected numbers. Note, that there is no prize awarded for hitting 1 of 5 player selected numbers. The prize at game event 17 represents the award for hitting 3 of 5 player selected numbers. The prize at game event 22 represents the award for hitting 4 of 5 player selected numbers. Finally, the prize at game event 48 represents the prize awarded for hitting 5 of 5 player selected numbers.

The cumulative award line 310 shows that the player should have terminated the game session after game event 22. However, had the player terminated the game session after game event 22, the player would have been foregoing the additional prize associated with hitting five player selected numbers. The risk of pursuing the final 5-spot prize would depend on the payout associated with hitting the fifth player selected number, and the probabilities of hitting the fifth player selected number.

One simple illustrate strategy to conserve the player's prize winnings that would permit the player to have the opportunity to hit the fifth player selected number would be to terminate the game session after 30 game events. This strategy would be limited to occasions where the player hits 4 of the 5 player selected numbers in a 5-spot keno game in the first 30 game events. Recall that this is the same strategy adopted for the chart in FIG. 10.

If this simple skill based strategy results in a small increase of 1% for the base payback percentage of 90%, then the increased payback percentage results in the player achieving an 11% improvement in the amount of playing time. If the skill based strategy results in an increase of 2% for the base payback percentage of 90%, then the player achieves a 25% improvement in the amount of playing time. Thus, the heightened level of interactivity benefits the player substantially and is a substantial departure from the prior art keno games.

It shall be appreciated by those skilled in the art having the benefit of this disclosure that the skill based strategy provided above is an illustrative strategy. A plurality of different strategies may be adopted by the player during the game session. Each strategy is going to be dependent on the paytable and the probabilities of the subsequent game event. The player strategy is used to achieve an improved payback percentage that exceeds the payback percentages for a minimal skill based strategy.

Although the description above contains many embodiments, these should not be construed as limiting the scope of the claims but as merely providing illustrations of some of the presently preferred embodiments. Thus, the scope of the invention should be determined by the appended claims and their legal equivalents rather than by the illustrative examples given.

What is claimed is:

1. A gaming method for operating an electronic game on a gaming device, comprising:

enabling a player to select one or more triggering events that trigger the updating of at least one game history counter, wherein the one or more triggering events are selected at a beginning of a game session associated with the gaming device;

providing a dynamic paytable that describes a plurality of prizes that may be awarded during the game session, the dynamic paytable comprising, the at least one game history counter, and a threshold event that is engaged after one or more user selectable triggering events among the one or more triggering events occur, the threshold event configured to use the game history counter to determine if a particular user selectable triggering event results in a player award;

displaying the game session on a display, wherein the game session includes a plurality of game events performed on the gamine device, each of the game events providing a player with an opportunity to be awarded one of the plurality of prizes;

identifying with a meter one or more credits charged for each game event;

modifying the dynamic paytable during the game session after one or more game events, wherein the dynamic paytable is configured to be calculated based on the probability of each threshold event occurring during each game event;

modifying the dynamic paytable according to a graduated weighting function that weighs probabilities in the player's favor as more game events are played during the game session; and determining whether to continue the game session or to terminate said game session with a first button after each game event.

2. The method of claim 1 further comprising charging the player at least one credit for each game event except for game events in which the one or more triggering events immediately follow a prior triggering event.

3. The method of claim 1 further comprising permitting said player to view said dynamic paytable before said player initiates of one said game events.

4. The method of claim 1 further comprising generating said paytable with a look-up table stored within said electronic game.

5. The method of claim 1 further comprising permitting said player to apply player skill to terminate said game session.

6. The method of claim 1 wherein prior to permitting said player to terminate said game session, said player has an opportunity to evaluate a plurality of strategies to preserve winnings or to reduce losses.

7. The method of claim 1 wherein said dynamic paytable further comprises an overall payback percentage.

8. The method of claim 1 wherein said dynamic paytable includes a pay allocation that determines a percentage of a total prize award for each threshold event.

9. The method of claim 1 wherein said dynamic paytable includes pay caps that determines a maximum award that can be paid to said player.

10. The method of claim 1 wherein said paytable is modified according to an equation:

$$PAY(I)=ROI*ABET*WGT(I)*AL(IHIT)/PR(I)$$

where,

ROI is an overall payback percentage;

ABET is an average bet;

WGT(I) is a graduated weighting function that weights probabilities in the player's favor for game events that occur at the end of the said game session;

AL(IHIT) is a pay allocation weighting function; and

PR(I) is a probability for the next game event.

11. The method of claim 1 further comprising engaging a random drawing by said game event for each game event.

12. An interactive game operating on a gaming device, comprising:

an input component configured to receive a selection of one or more triggering events that trigger the updating of at least one game history counter, wherein the one or more triggering events are selected at a beginning of a game session on the gaming device;

a dynamic paytable that describes a plurality of prizes that may be awarded during a game session, the dynamic paytable modified during the game session and comprising, the at least one game history counter, a threshold event that is engaged after one or more user selectable triggering events among the one or more triggering events occur, the threshold event configured to use the game history counter to determine if a particular user selectable triggering event results in awarding the player one of the prizes, and a graduated weighting function that weighs probabilities corresponding to the dynamic paytable in the player's favor as more game events are played during the game session;

a display configured to display the game session associated with the interactive game wherein the game session comprises a plurality of game events performed on the gaming device, each of the game events providing an opportunity to award one of the plurality of prizes;

a meter that identifies one or more credits charged to the player for each game event; and a first button that permits the player to terminate the game session after each game event, wherein the dynamic paytable is calculated after one or more game events among the plurality of game events based on the probability of each threshold event occurring during each game event.

13. The interactive game of claim 12 wherein said meter charges said player at least one credit for each game event except for game event in which said one or more triggering event immediately follow a prior triggering event.

14. The interactive game of claim 12 wherein said dynamic paytable is viewed by said player before said player initiates one of said game events.

15. The interactive game of claim 12 wherein said dynamic paytable is a look-up table stored within said electronic game.

16. The interactive game of claim 12 wherein said dynamic paytable further comprises an overall payback percentage.

17. The interactive game of claim 12 wherein said dynamic paytable includes a pay allocation that determines a percentage of a total prize award for each threshold event.

18. The interactive game of claim 12 wherein said dynamic paytable includes pay caps that determine a maximum award that can be paid to said player.

19. The interactive game of claim 12 wherein said paytable is modified according to an equation:

$$PAY(I)=ROI*ABET*WGT(I)*AL(IHIT)/PR(1)$$

where,

ROI is an overall payback percentage;

ABET is an average bet;

WGT(I) is a graduated weighting function that weights probabilities in the player's favor for game events that occur at the end of the said game session;

AL(IHIT) is a pay allocation weighting function; and

PR(I) is a probability for the next game event.

20. The interactive game of claim 12 further comprising a second button that engages a random drawing for each game event.

21. The interactive game of claim 12 further comprising a second button that engages a drawing that appears random for each game event.

* * * * *